(12) United States Patent
Giner

(10) Patent No.: US 10,520,314 B2
(45) Date of Patent: Dec. 31, 2019

(54) GYROSCOPE

(71) Applicant: Hitachi, Ltd., Chiyoda-ku, Tokyo (JP)

(72) Inventor: Joan Giner, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 179 days.

(21) Appl. No.: 15/911,270

(22) Filed: Mar. 5, 2018

(65) Prior Publication Data

US 2018/0266822 A1 Sep. 20, 2018

(30) Foreign Application Priority Data

Mar. 15, 2017 (JP) ................................ 2017-050201

(51) Int. Cl.
*G01C 19/00* (2013.01)
*G01C 19/574* (2012.01)

(52) U.S. Cl.
CPC ................................ *G01C 19/574* (2013.01)

(58) Field of Classification Search
CPC .............................. G01C 19/574; G01C 19/00
USPC ........................................................ 73/504.13
See application file for complete search history.

(56) References Cited

U.S. PATENT DOCUMENTS

| | | | | |
|---|---|---|---|---|
| 7,258,008 B2 * | 8/2007 | Durante | ............. | G01C 19/5747 73/504.04 |
| 2008/0028855 A1 * | 2/2008 | Kano | ................. | G01C 19/5698 73/504.12 |
| 2013/0019677 A1 * | 1/2013 | Coronato | ............. | G01C 19/572 73/504.02 |
| 2016/0084654 A1 | 3/2016 | Senkal et al. | | |
| 2018/0266822 A1 * | 9/2018 | Giner | ................... | G01C 19/574 |

* cited by examiner

*Primary Examiner* — Jamel E Williams
(74) *Attorney, Agent, or Firm* — Crowell & Moring LLP

(57) ABSTRACT

The purpose of this invention is obtaining a gyroscope with high Q factor, high as fabricated symmetry and reducing the quadrature error. One aspect of this invention is a gyroscope including a semiconductor chip. This semiconductor chip comprising a substrate, first mass, second mass, connection unit. The first mass can move in any direction of a X-Y plane. The second mass can move in any direction of the X-Y plane. The connection unit located between the first mass and the second mass mechanically connects the first mass and the second mass. The connection unit comprises anchor fixed to the substrate, first shuttle located between the anchor and the first mass, second shuttle located between the anchor and the second mass, first beam connecting the anchor and the first shuttle, second beam connecting the anchor and the second shuttle, third beam connecting the first mass and the first shuttle, fourth beam connecting the second mass and the second shuttle, and fifth beam connecting the first shuttle and the second shuttle. The anchor is located between the first shuttle and the second shuttle.

15 Claims, 15 Drawing Sheets

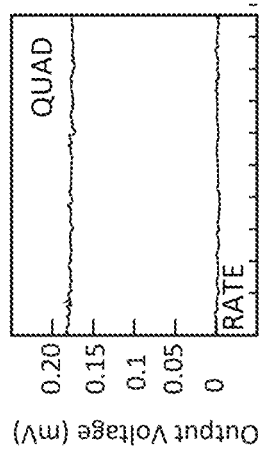
Fig. 4A
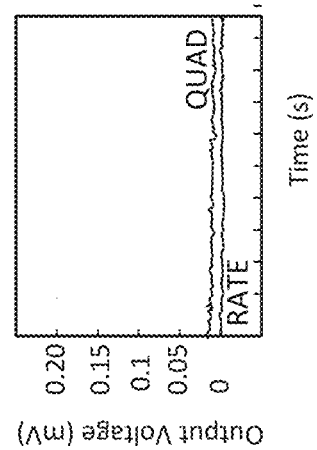
Fig. 4B
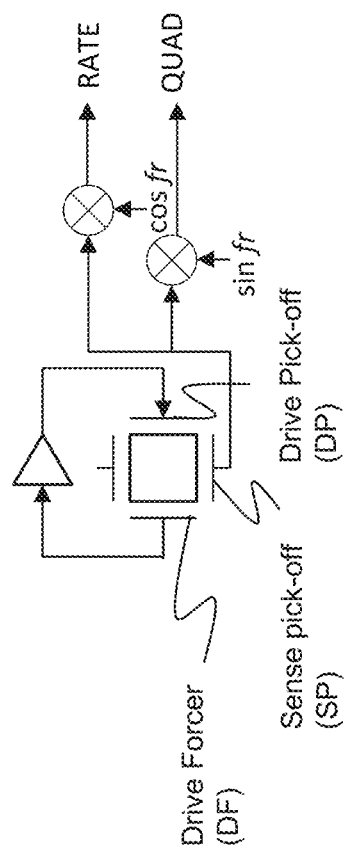

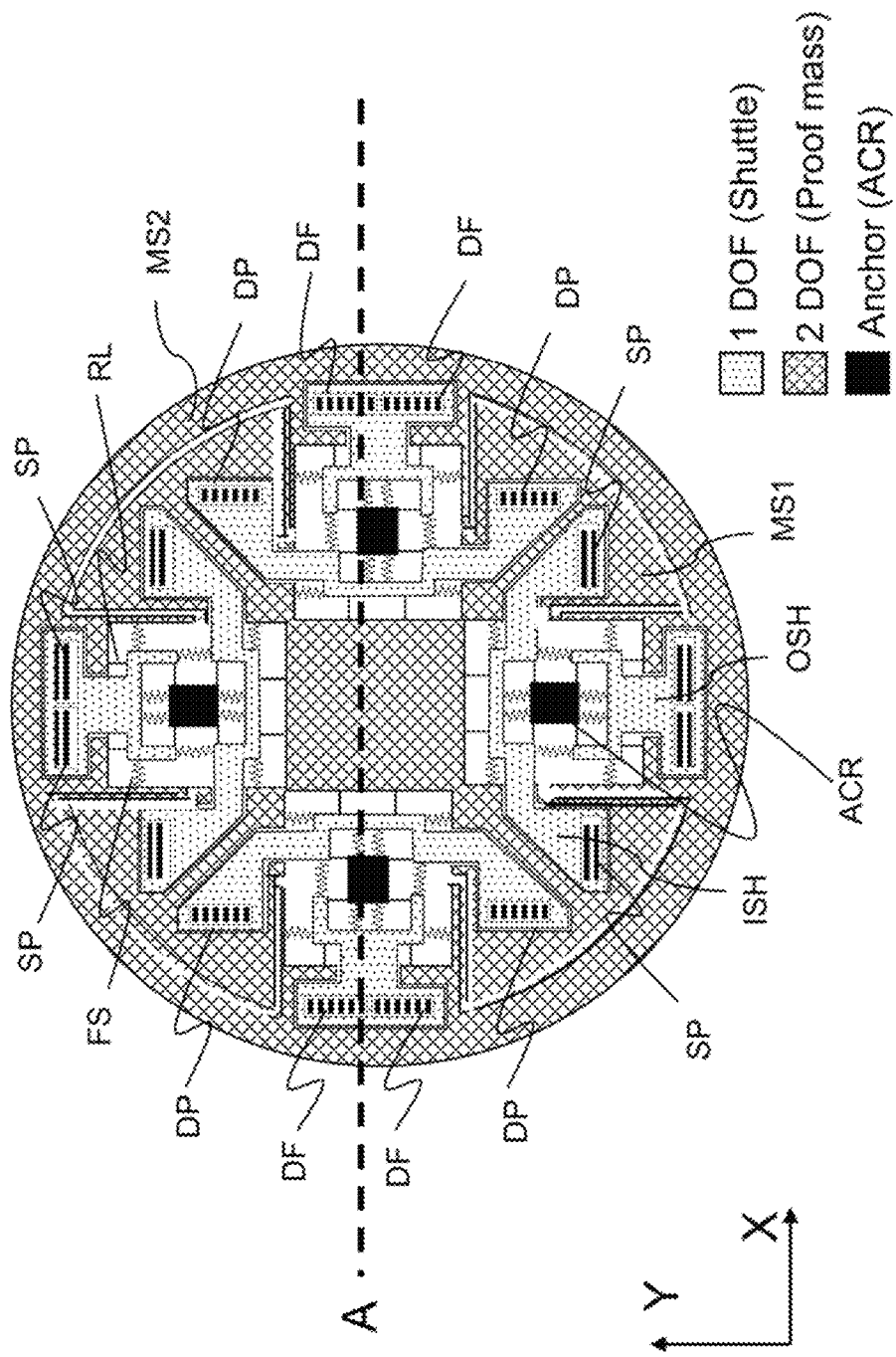

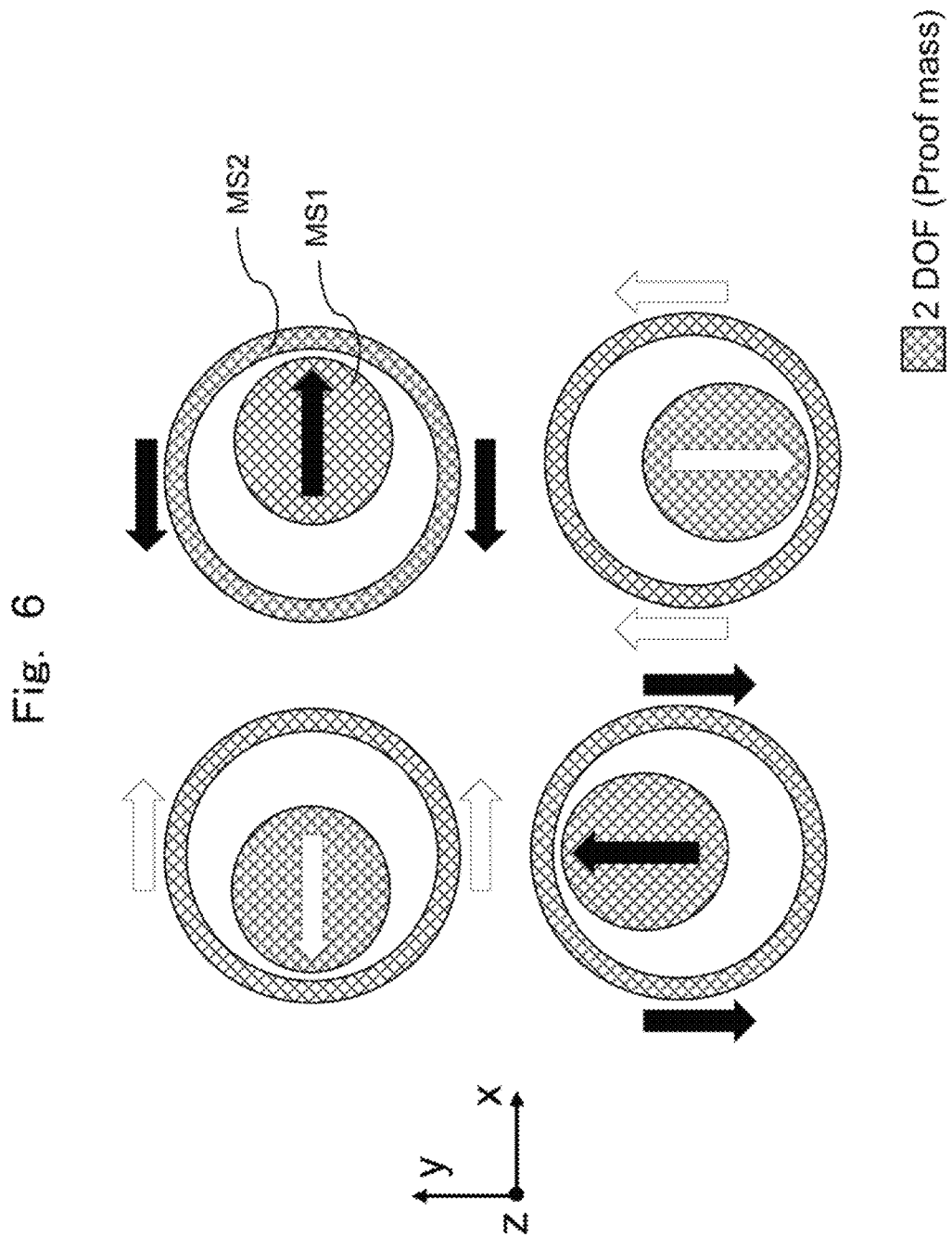

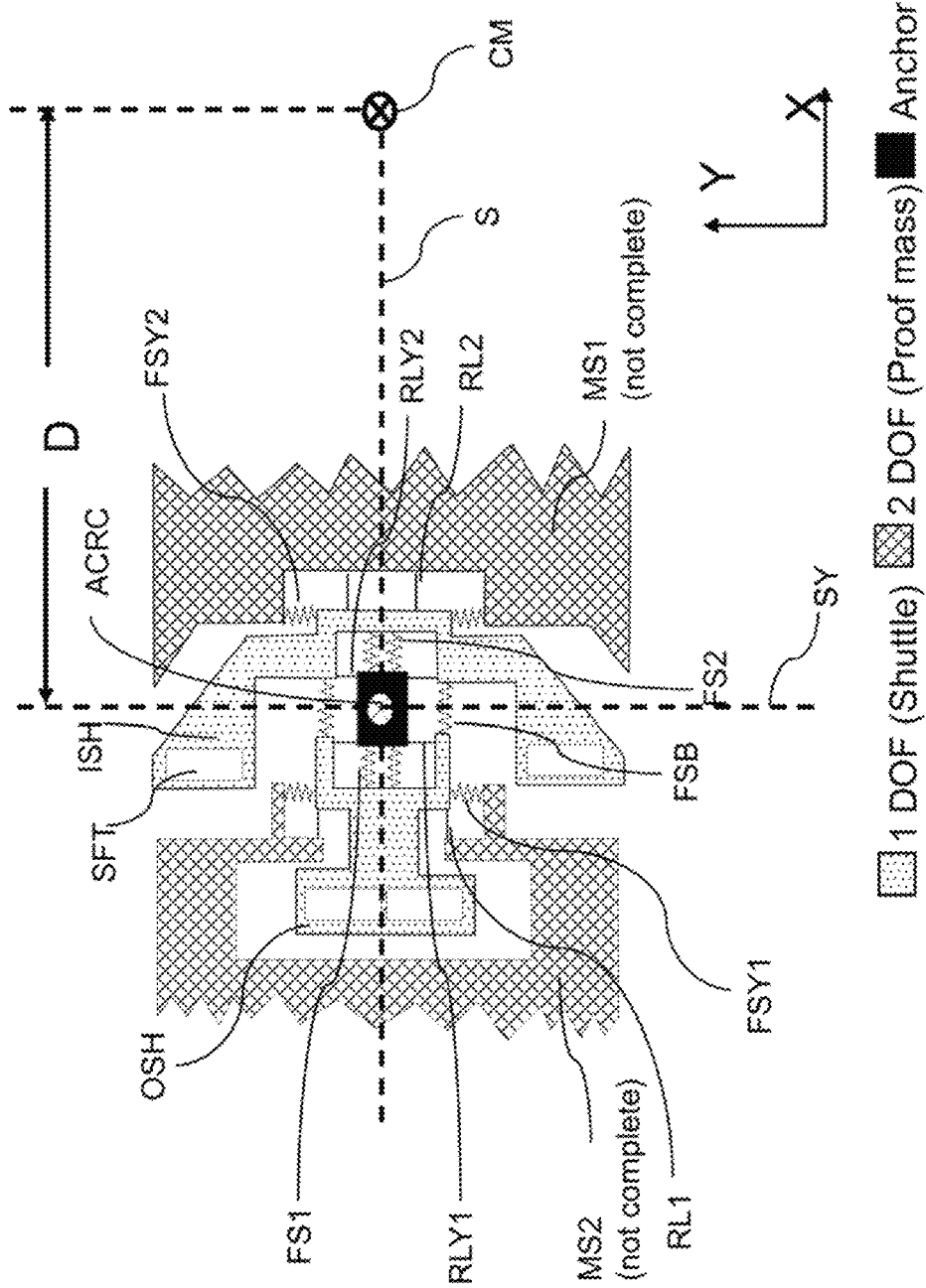

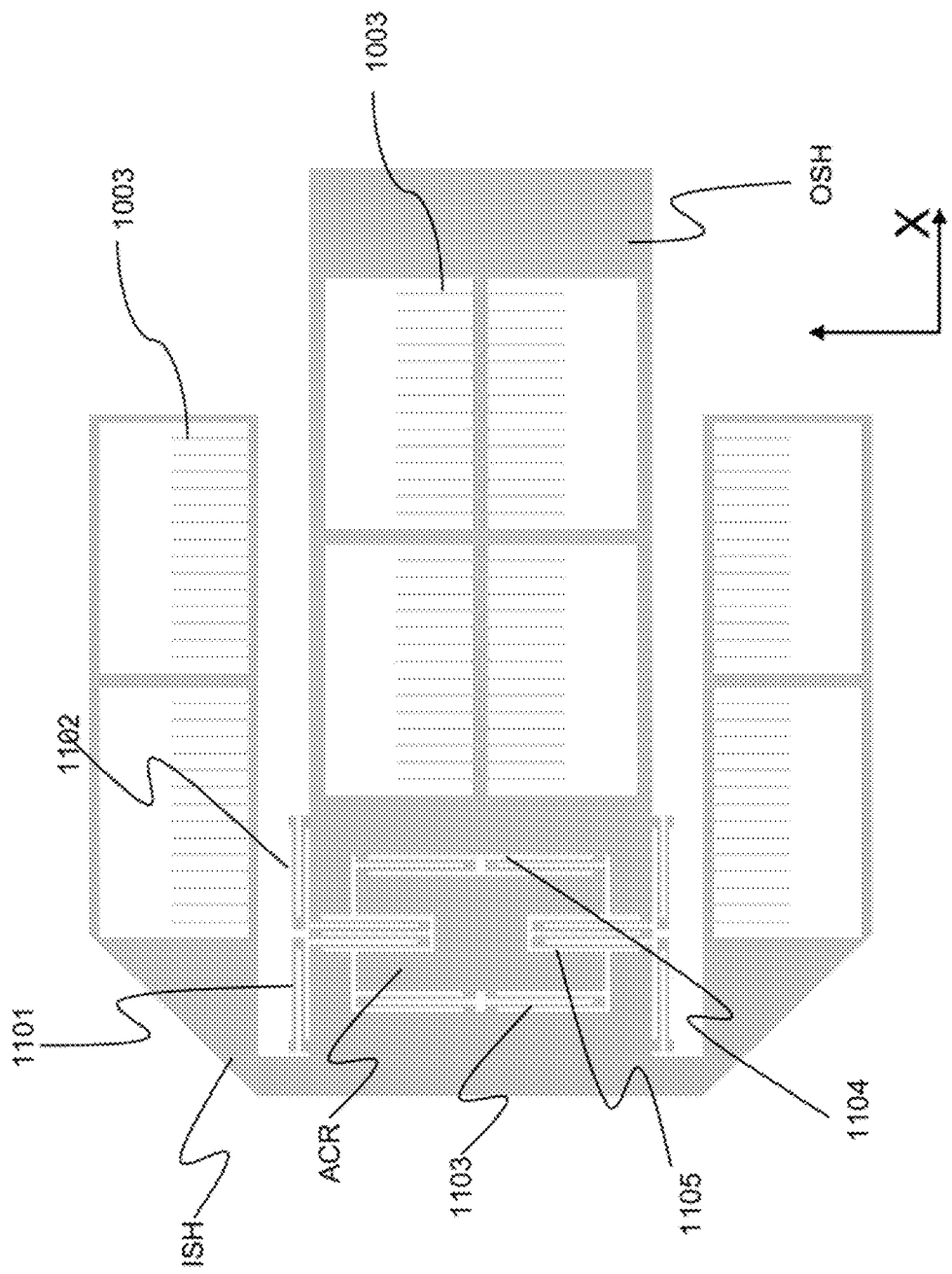

GYROSCOPE

TECHNICAL FIELD

This invention is related to the field of Gyroscope especially Coriolis Vibratory Gyroscope (CVG), for detecting angle of rotation or angular velocities.

BACKGROUND OF THE INVENTION

Patent Literature 1 discloses a CVG for detecting angle of rotation using the Foucault Pendulum.

CITATION LIST

Patent Literature

[Patent Literature 1]
  US 2016/0084654 A1

SUMMARY OF THE INVENTION

Technical Problem

Gyroscopes are a fundamental block of navigation, pointing, stability control systems. A gyroscope is able to detect angular velocities. Accuracy of the gyroscope have a direct impact on the accuracy of the overall system, often an Inertial Measurement Unit (IMU) formed by accelerometers, magnetometers and other sensors.

For autonomous navigation in environments where conventional navigation aiding signals from Global Positioning System (GPS) are not reliable or simply not available such as in a indoor parking lot or on the streets of the densely populated city with high buildings, accuracy below 0.01 degrees per hour is required. Up to date, this level of performance is achieved by bulky and costly Fiber Optic Gyroscope (FOG) and Laser Ring Gyroscope (RLG). However, the global trend towards the miniaturization, cost reduction and ubiquity makes the use of such units not desirable.

Micro Electromechanical Coriolis Vibratory Gyroscopes are seen as an alternative due to its low cost, small size and low power consumption. Up to date the level of performance of Micro Electro Mechanical Systems (MEMS) Gyroscope has not reached the navigation grade specifications.

An example of application of the CVG is the measurement of the angle of a trajectory of underground vehicle. In underground territories such as mines there is not access to external position signal such the GPS. In this case, navigation, position location and control depends only on the inertial sensors that are grouped into an IMU. Gyroscope are an important part of such system because of the angle measurement capability.

For example, an underground vehicle with not access to the GPS has a memory with coordinates of the underground excavated tunnels. To safely follow the right trajectory, sensor is used to control the steering angle of the wheels and the rotation of the vehicle and provide the information to control the speed and the angle of rotation and to update the current position of the vehicle.

In general, CVG are symmetric in X and Y axis. In general CVG are formed by a driving mass and a sensing mass that are continuously oscillating. In some cases the driving mass and the sensing mass are the same. When angular velocity is applied to the mass, a Coriolis force is generated. Angular velocity can be measured by detecting the displacement of the sensing mass that has been induced by the Coriolis force.

For such type of resonator, the amplitude of displacement generated by the Coriolis force is multiplied by the Quality factor (Q factor) of such mode thus increasing the sensitivity. The direction of the drive motion and the direction of sense motion are orthogonal. The drive motion axis is called "drive" in the followings, and the axis of the Coriolis induced force is called "sense" in the followings. In such sensors, it is critical to increase the Q factor. In addition, Q factor affects the performance of the gyroscope since it is related to the thermo-mechanical noise, the forcer electronics induced bias and the power consumption.

However, there is several factors that affect the overall Q factor of the resonator.

(1) Viscous damping caused by air or other fluid material around the movable part.

(2) Material losses such as thermo-elastic damping.

(3) Anchor losses due to the leak of mechanical energy via the substrate.

In high performance application all the previous Q factors have to be maximized. For this reason and in order to eliminate the air damping, vibratory gyroscopes are often operated in high vacuum. Material loses can be greatly reduced.

Anchor losses are one of the factor more difficult to reduce due to the fabrication imperfection and the complexity of the phenomena. In the following paragraph, we show the evolution of the design in prior art that can mitigate the leak of energy (responsible for low Q factor) in micro machined gyroscopes.

A simple CVG can be a single mass that can oscillate in any direction of the X-Y plane. In general the CVG is forced to oscillate in one of the axis, for example, X axis (drive axis). And the vibration of the orthogonal axis Y (sense axis) are measured. When there is a rotation on the perpendicular axis of the plane X-Y, that is the Z axis, the energy from the X axis is transmitted to the Y axis due to the Coriolis force. Amplitude of oscillation in the sense axis is proportional to the Coriolis force. Measuring the vibration on the sense axis allows one to measure the angular velocity.

In conventional MEMS based CVG proof mass is anchored to the substrate via flexural springs (flexible link). The displacement of the proof mass creates a load on the spring. $F=kx$, where F is the force, k is the spring constant of the flexural springs, and x is the displacement of the proof mass. According the Newton's second law, the force exerted on the spring by the proof mass is accompanied by an equal and opposite force from the substrate to the spring. This is the main source of energy loss via the substrate.

A dual mass tuning fork configuration has been proposed previously in order to address the energy loss problems. However, because there is distance between the center of the two masses, the anchor loss were canceled in the axis that cross both center of masses but not on the orthogonal axis.

In Patent Literature 1, other researchers have proposed dynamically balanced structure in force and momentum based on concentric resonator operating in tuning fork fashion. That is, as shown in FIG. 14 of Patent Literature 1, this device has two masses, one is located at center and the other is surrounding it. Both masses are moving in the same direction but with opposite phases. Four anchors are located near the corner of the device. In Addition, four pairs of shuttles were used to decouple the motion from X and Y axis and the transducers were built inside the shuttles.

However, high Q factor is only effective if the frequency of the drive and sense axis is the same. For any skilled designer it is easy to design a mass balanced gyroscope with the same frequency for both operational modes, X and Y, by using computer aided design (CAD) tools and finite element simulators.

However, the fabrication imperfections introduced during the manufacturing process creates asymmetries thus separating the operational frequencies of the sense and drive (Difference between operational frequency of the sense and the drive: Δf≠0) thus cancelling the benefits obtained with high Q factor.

In addition, since the CVG will operate under mode matched condition, post fabrication frequency tuning, such as electrostatic tuning are often in place in order to match frequencies. In this case, the electrostatic force applied on the movable masses introduces force imbalance thus breaking the design considerations taken initially.

In general, micro machined sensors are fabricated on large area silicon based-wafer. In the fabrication process one of the main sources of error is the etching of the structural silicon by Deep Reactive Ion Etching (DRIE). Specially the springs are more sensitive to fabrication imperfections. Optimization of the DRIE process can reduce the amount of imperfection during the fabrication process, but the process is still a non uniform process that affects differently devices located at the center of the wafer and in the perimeter of the wafer. Therefore the area of the target to be etched will define the tolerances of the process.

The purpose of this invention is obtaining a Gyroscope with high Q factor, small separation between the frequencies of the operational modes and reducing the quadrature error.

Solution to Problem

One aspect of this invention is a Gyroscope including a semiconductor chip. This semiconductor chip comprises a substrate, first mass, second mass, connection unit. The first mass can move in any direction of a X-Y plane. The second mass can move in any direction of the X-Y plane. The connection unit located between the first mass and the second mass mechanically connects the first mass and the second mass.

The connection unit comprises anchor fixed to the substrate, first shuttle located between the anchor and the first mass, second shuttle located between the anchor and the second mass, first beam connecting the anchor and the first shuttle, second beam connecting the anchor and the second shuttle, third beam connecting the first mass and the first shuttle, fourth beam connecting the second mass and the second shuttle, and fifth beam connecting the first shuttle and the second shuttle. The anchor is located between the first shuttle and the second shuttle.

According to one possible arrangement, the first shuttle and the second shuttle have a different shape, and each of them have an electrode.

According to one possible arrangement, when defining an area Ac as area of the semiconductor chip, and an area As as area covering all of the connection units, ratio of As for Ac is smaller than 0.7.

Advantageous Effect of Invention

Obtaining a Gyroscope with high Q factor and reducing the quadrature error.

BRIEF DESCRIPTION OF THE DRAWINGS

FIGS. 4A and 4B Examples of a detection circuit diagram for sense pick off and drive pick off.

FIG. 5 A top view of the proposed embodiment.

FIG. 6 A diagram of the displacement of the outer mass MS2 and inner mass MS1.

FIG. 8 A detailed top view of the improved shuttles in FIGS. 5 and 7.

FIG. 11 A top view of an example of an actual implementation of an asymmetric spring-shuttle-anchor module.

FIGS. 12A and 12B Top views of an example of deformation of the beams shown in FIG. 11.

DESCRIPTION OF EMBODIMENTS

Figure 1:
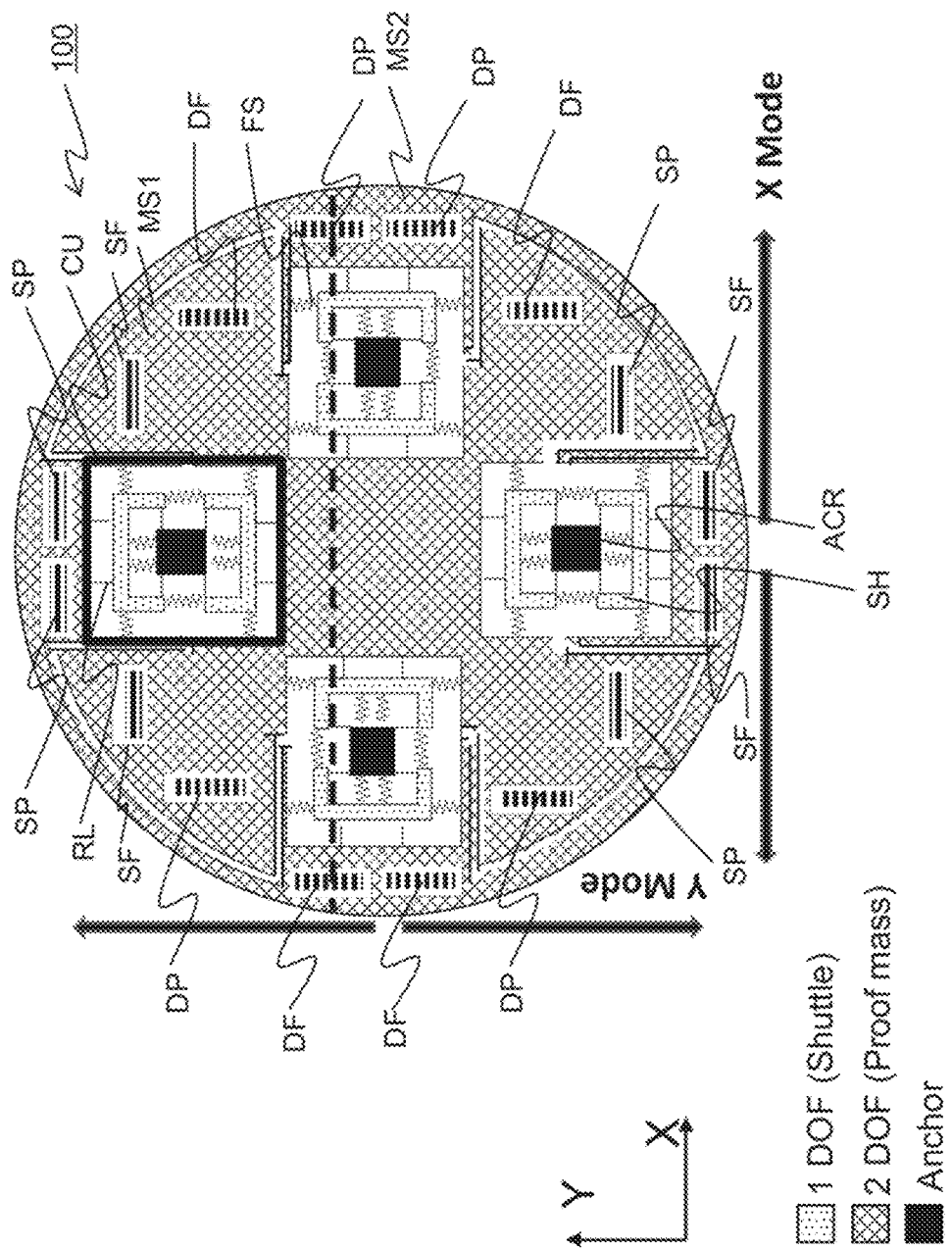
FIG. 1 A plan view of an example of proposed embodiment.

The exact nature of this invention, as well as its object and advantages, will become readily apparent upon reference to the following detailed description when considered in conjunction with the accompanying drawings, in which like reference numerals designate like parts throughout the figures thereof.

Embodiment 1

Embodiment 1 is an example of Coriolis Vibratory Gyroscope having a electrodes embedded into the proof mass. The shuttles are placed symmetrically.

FIG. 1 shows an example of proposed embodiment. Micromachined gyroscope, CVG 100 has 2 degrees of freedom (2 DOF) concentric proof masses MS1 and MS2 that shares the same center of mass. 1st mass (inner mass) MS1 is located inner position and 2nd mass (outer mass) MS2 is located outer position. inner mass MS1 and outer mass MS2 have substantially same mass.

Between 2 masses, 4 connection units CU are located. Connection units CU are mechanically connecting 2 masses MS1, MS2 and anchor ACR. Connection units CU includes anchor ACR and flexural beams which connects 2 masses MS1, MS2 and anchor ACR.

CVG 100 having, a number N of anchors, and 2×N shuttles. FIG. 1 shows an example having 4 anchors ACR those are located at the center of connection units CU. 2 shuttles SH are prepared for each anchor ACR. Each shuttle configures 1 degree of freedom (1 DOF) movable parts.

N sets of flexural beams connect the anchors ACR to the shuttles SH, the shuttle SH to the masses MS1, MS2 and each pair of shuttle SH. In particular, each anchor ACR is located in the middle of a pair of shuttles SH. The flexural beam may have 2 functions. One is flexible spring (flexible link) and the other is rigid link. Flexible spring FS and rigid link RL are shown in FIG. 1 separately, but they can be a single parts.

There is drive forcer DF for oscillating the mass MS2 in X direction. The drive forcer DF is arranged in the mass MS2. There are plurality of drive pick off DP for detecting the oscillation of mass MS2 in the X direction. The drive pick off DP is arranged in the mass MS2. There is drive forcer DF for oscillating mass MS1 in the X direction. The drive forcer DF is arranged in the mass MS1. There is drive pick off DP for detecting the oscillation of the mass MS1 in the X direction. The drive pick off is arranged in the mass MS1.

There is sense forcer SF for oscillating the mass MS2 in Y direction. The sense forcer SF is arranged in the mass MS2. There is sense pick off SP for detecting the oscillation of mass MS2 in the Y direction direction. The sense pick off SP is arranged in the mass MS2. There is sense forcer SF for oscillating mass MS1 in the Y direction. The sense forcer SF is arranged in the mass MS1. There is sense pick off SP for detecting the oscillation of the mass MS1 in the Y direction. The sense pick off SP is arranged in the mass MS1.

Drive forcer DF, drive pick off DP, sense forcer SF, and sense pick off SP is comprising parallel plate electrode. Each electrode comprises plurality of fixed plate and plurality of movable plate. Fixed plate and movable plate are arranged in parallel. According to the displacement of the mass, the movable plate displaces so as to the distance between the fixed plate and movable plate is modulated. Then capacitance of the electrode changes, and the mass displacement can be detected as an electric signal by drive pick off DP, and sense pick off SP. On the other hand when an oscillation signal is applied to the electrode, it is functioned as a Drive forcer DF and sense forcer SF.

Figure 2:
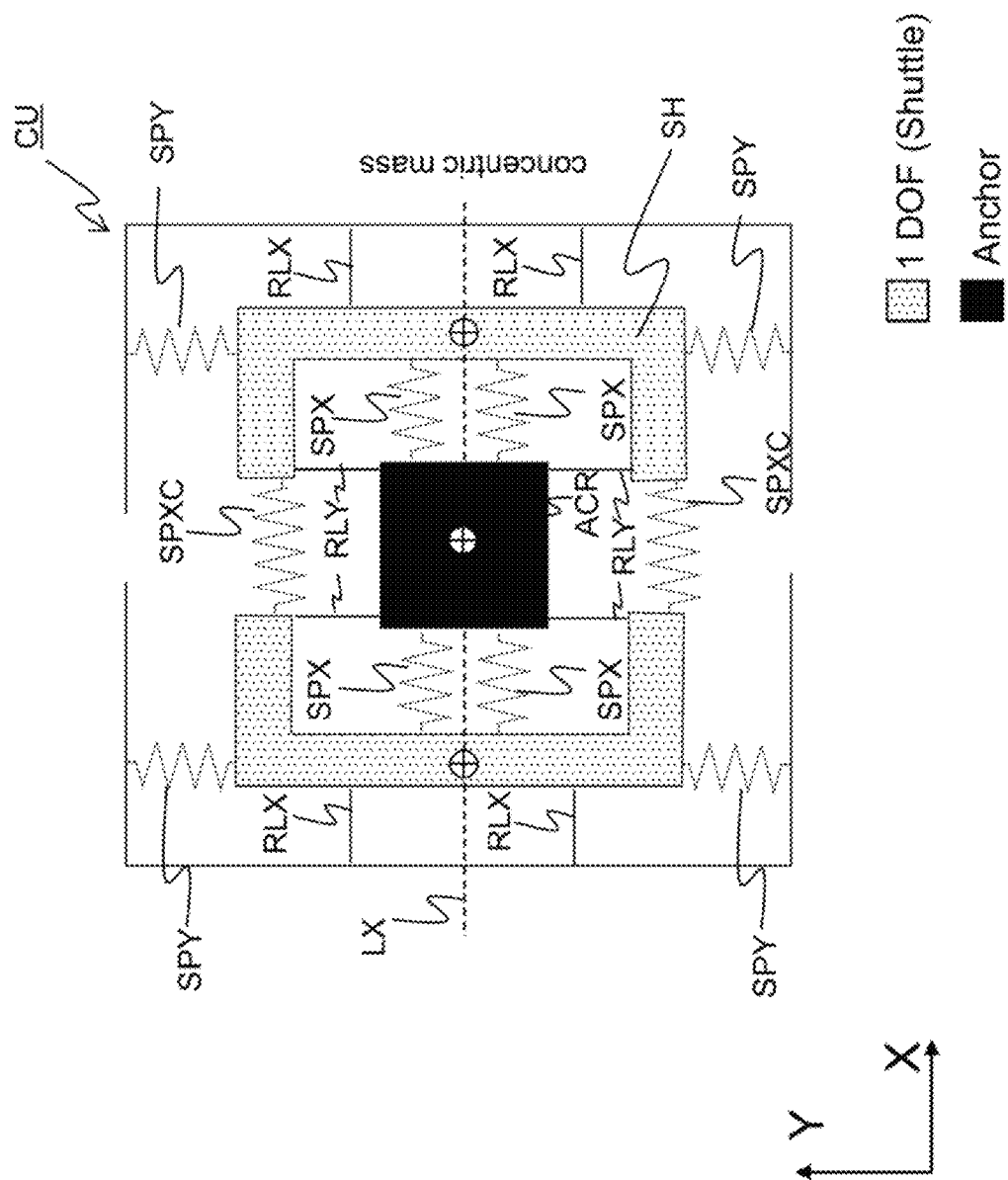
FIG. 2 A plan view of an example of proposed embodiment.

FIG. 2 shows a detailed plane structure at one of the connection units CU. Shuttles SH are attached to the anchor ACR with a set of spring SPX compliant in the direction of a line LX that crosses the center of mass of the anchor ACR and the pair of shuttle SH. Flexible springs SPX allow 1 degree of freedom in X direction to the shuttles SH. Shuttles SH are attached to the anchor ACR very stiff in the corresponding perpendicular direction of a line LX by a set of rigid links RLY. As mentioned in explanation of FIG. 7 below, anchor ACR is located between 2 shuttles SH. Two shuttles are arranged left-right symmetry. This structure can decrease energy loss at anchor ACR.

Shuttles SH are mechanically connected with a flexural spring SPXC compliant in the direction of the line LX. Shuttles SH are attached to the concentric mass MS1 or MS2 with flexural springs SPY compliant in the perpendicular direction to the line LX. Shuttles SH are attached to the concentric mass very stiff in the direction of the line LX. by a set of rigid links RLX.

Stiffness constant of the springs SPX, SPY that connect the shuttles SH to the mass MS1, MS2 and the shuttles SH to the anchor ACR are designed to be the same to guarantee the same natural frequency in both directions. Stiffness constant of the spring SPXC that connects each pair of shuttle SH can be of a different value.

In the structure shown in FIG. 1, we developed concentrated anchor architecture based MEMS CVG in order to reduce the effect of the thermal stress provided by the package. The strategy locates the anchors close to the center of the device. In addition, by following the strategy we can also reduce the area where the DRIE sensitive elements such as springs are spared on.

FIG. 3 shows the effect of concentrated anchor architecture. Connection units CU includes anchor and flexural spring. Here, we define area Ac 300 as area of chip. Area Ac 300 is substantially same with the area of semiconductor chip which the device (MEMS Gyroscope) is formed on. When the device was round shape, the chip shape thought to be a circumscribed square (see FIG. 13). We also define area As 301, 302 as the area covering all connection units CU. As mentioned above, connection units CU includes anchor and flexural beam. Ratio of As for Ac is smaller than 0.7. More preferably smaller than 0.5.

Figure 3B:
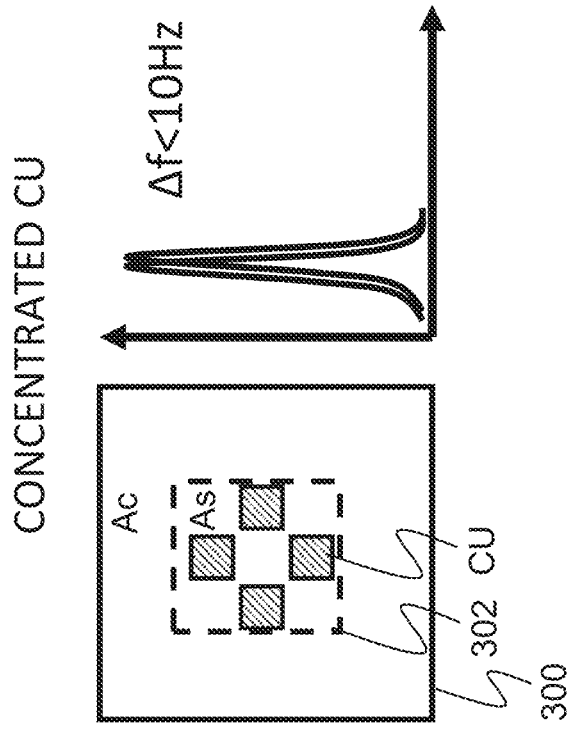
FIGS. 3A and 3B Diagrams depicting the effect of concentrated anchor architecture.
Figure 3A:
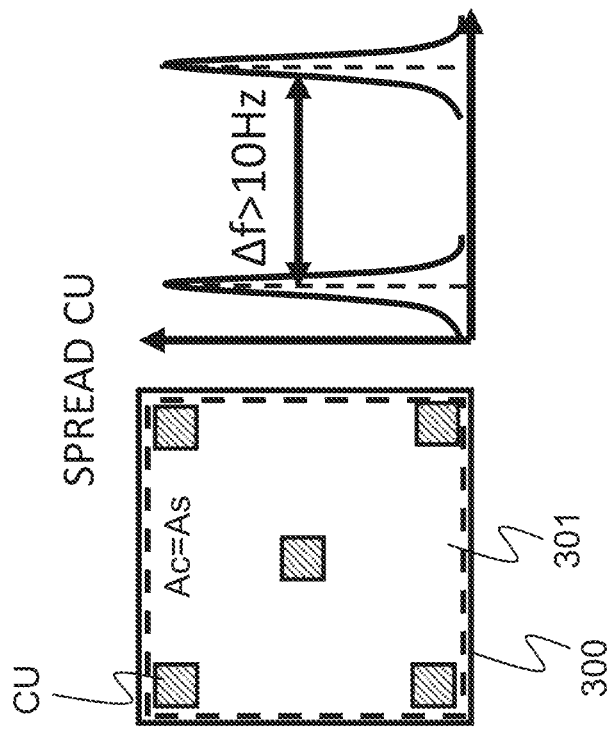
Figure 14:
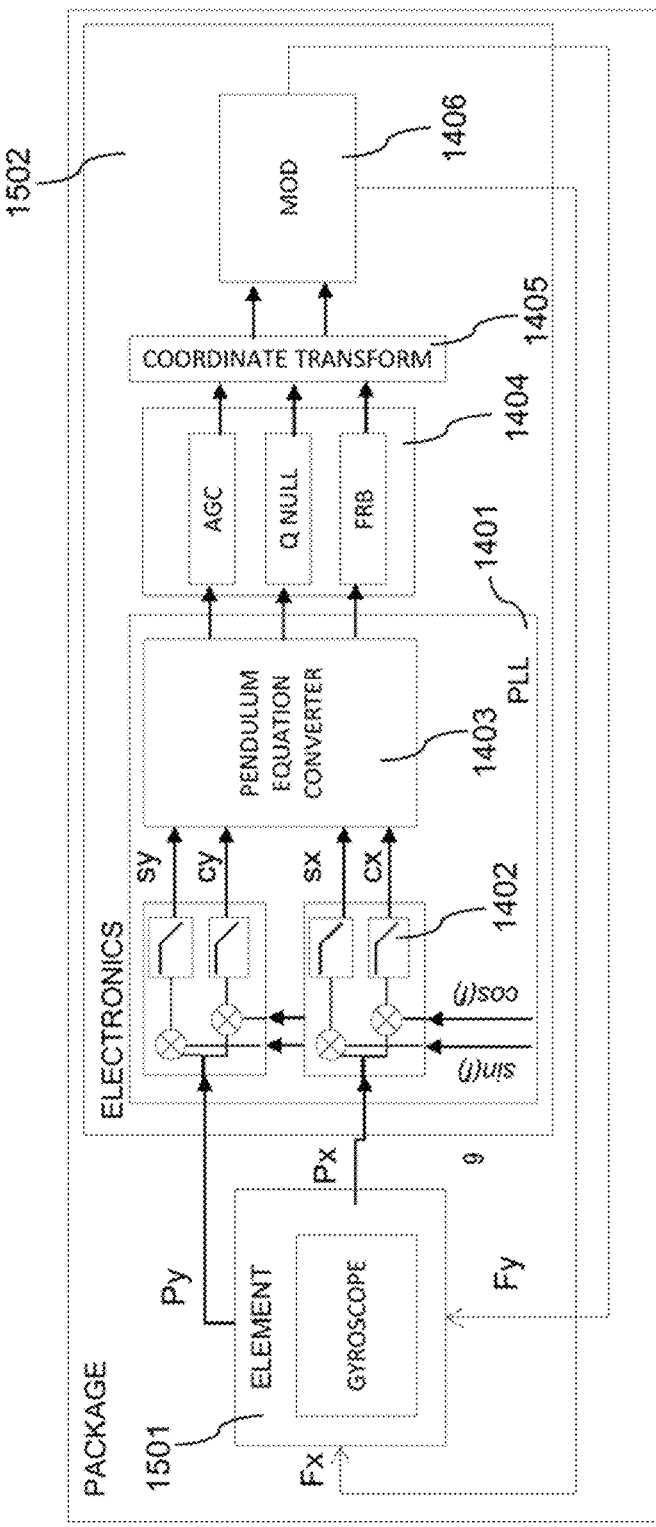
FIG. 14 A block diagram of a control circuit.

According to the "spread" anchor architecture (left hand FIG. 3(a); which is correspond to FIG. 14 of patent literature 1 for example), connection units CU are scattered on the device 300 and an area As 301 including connection units CU is broad. FIG. 3 also shows a frequency characteristics graph. The abscissa of the graph of waveform is the frequency, and the ordinate represents the intensity value. In this case, difference of physical property of springs cause frequency shift Δf of X and Y axis which is larger than 10 Hz (A>10 Hz).

On the other hand by reducing the area As 302 (right hand FIG. 3(b), which is corresponds to FIG. 1) we can increase the uniformity of the DRIE process by reducing the etching tolerance in the springs. That set the frequency on X and Y potentially achieve perfect as fabricated symmetry in X and Y. The frequency shift Δf of X and Y axis would be smaller than 10 Hz (Δf<10 Hz). In this case, ratio of As for Ac is smaller than that of the condition of FIG. 3(a).

According to the concentrated anchor architecture, the connection units CU is back from the edge of the device 300. In order to keep the anchors ACR close to the center of the device, decoupling shuttles SH size is reduced and the electrodes (electrostatic actuation and capacitive sensors) are embedded inside the movable structures. To drive the gyroscope a signal with the same frequency than the resonant frequency is applied in the drive electrodes (drive forcer DF). The displacement of the masses in the X direction is measured by using the pick off capacitive electrode (drive pick off DP). In presence of rotation both masses start oscillate in the Y direction.

With the actual configuration shown in FIG. 1, displacement in Y axis will produce a change in the overlapping area of the drive pick off DP capacitors. Due to the tuning fork movement, if the area of the pick off electrodes located in the inner mass increases, the area of the pick off electrodes located in the outer mass decreases. Therefore due to this differential behavior the common mode change of capacitance is canceled.

In the same way, when not angular velocity is applied, when the gyroscope is driven along the X axis using the drive forcer DF, the sense pick off SP electrodes can detect the lateral displacement and provide output, providing false rotation.

Due to fabrication imperfection, the fabricated parameters of the forcer and pick off capacitance introduces error in the sensed signal for both the drive and the sense axis. That happens to all micromachined gyroscope including the prior improvement shown in FIG. 1. The sense pick off SP electrodes are responsible to detect the velocity of vibration induced by the Coriolis force (which called "RATE"), but at the same time it also pick up the displacement due the drive oscillation. Coriolis vibration and drive vibration are 90 degrees phase shifted from each other. For that reason, the signal that depends on the drive oscillator is often called quadrature error (which called "QUAD"). Therefore, it is relatively easy to perform orthogonal demodulation of the output signal and separate the rate measurement from the error.

However a high quadrature error proposes two problems. On one side if the quadrature error is big due to fabrication imperfections, the signal can saturates the conditioning electronics. On the other side, if there is not a very tight control of the demodulating phases, part of the quadrature signal may pour onto the rate signal thus introducing detection.

FIG. 4 shows an example of detection circuit diagram for sense pick off and drive pick off. Signals "RATE" and "QUAD" are synchronization-detected by a sin fr (oscillation frequency) signature and cos fr signature. As mentioned above, if the quadrature error is big due to fabrication imperfections, the signal can saturates as shown in FIG. 4(a). It is preferable that the "QUAD" is controlled as shown in FIG. 4(b).

In order to avoid the lateral displacement of the sensing electrodes and maintain the specific features of the design, such as low anchor losses, concentrate anchors to reduce the fabricated frequency split we propose an embodiment as follows.

Embodiment 2

Embodiment 2 is an example of Coriolis Vibratory Gyroscope having a electrodes embedded into the shuttle. The shuttles are placed symmetrically in one direction and asymmetrically in other direction.

FIG. 5 shows a top view of the proposed embodiment. The core of the devices is two concentric masses of any shape, whose center of masses approximately coincide. Both masses, the inner mass MS1 and the outer mass MS2 have the substantially same mass. They are mass balanced. Outer mass MS2 is mechanically connected to the outer shuttle OSH. Inner mass MS1 is mechanically connected to the inner shuttle ISH.

N sets of flexural beams connect the anchors ACR to the shuttles, the shuttle to the masses MS1, MS2 and each pair of shuttle SH. The flexural beam may have 2 functions. One is flexible spring and the other is rigid link. Flexible spring FS and rigid link RL are shown in FIG. 5 separately, but they can be a single parts. Inner shuttle ISH and outer shuttle OSH are connected to the anchor ACR with a flexural beams.

Inner mass MS1 and outer mass MS2 are mutually connected via the shuttles ISH, OSH. Suspended masses MS1, MS2 are attached to fixed substrate using the anchors ACR. Anchor ACR are located in between the two masses MS1, MS2.

As same as the embodiment of FIG. 1, drive forcers DF are for example provided by capacitance having parallel plate electrode. The drive forcers DF oscillates the outer shuttles OSH in X direction. It is also possible to arrange the drive forcers DF to oscillate the inner shuttles ISH. The electrodes, embedded in the shuttles are simplified as squares but it is not limited to this shape. Parallel plate, comb fingers and other formats can be used for transduction.

As shown in FIG. 1 or FIG. 5, two masses are combined with complicated shape. Some part of both of two masses are arranged at same distance from the center of the device. For example the first mass MS1 has a recess toward a center of it. The second mass MS2 is surrounding the first mass MS1, and has a convex opposing to the recess. The connection unit CU is located between the recess and the convex.

FIG. 6 shows a diagram of the displacement of the outer mass MS2 and inner mass MS1 in out of phase condition in the X-Y axis. The masses can move in this phasing in any direction of the X-Y plane (2 DOF). In FIG. 6, spring, shuttle and anchor has been removed to simplify the understanding. Only the displacement of the mass is explained here. The primary mode of operation of the mechanical sensor is the out of phase mode. Masses are oscillating in the same direction but in opposite phase as depicted in FIG. 6.

Figure 7:
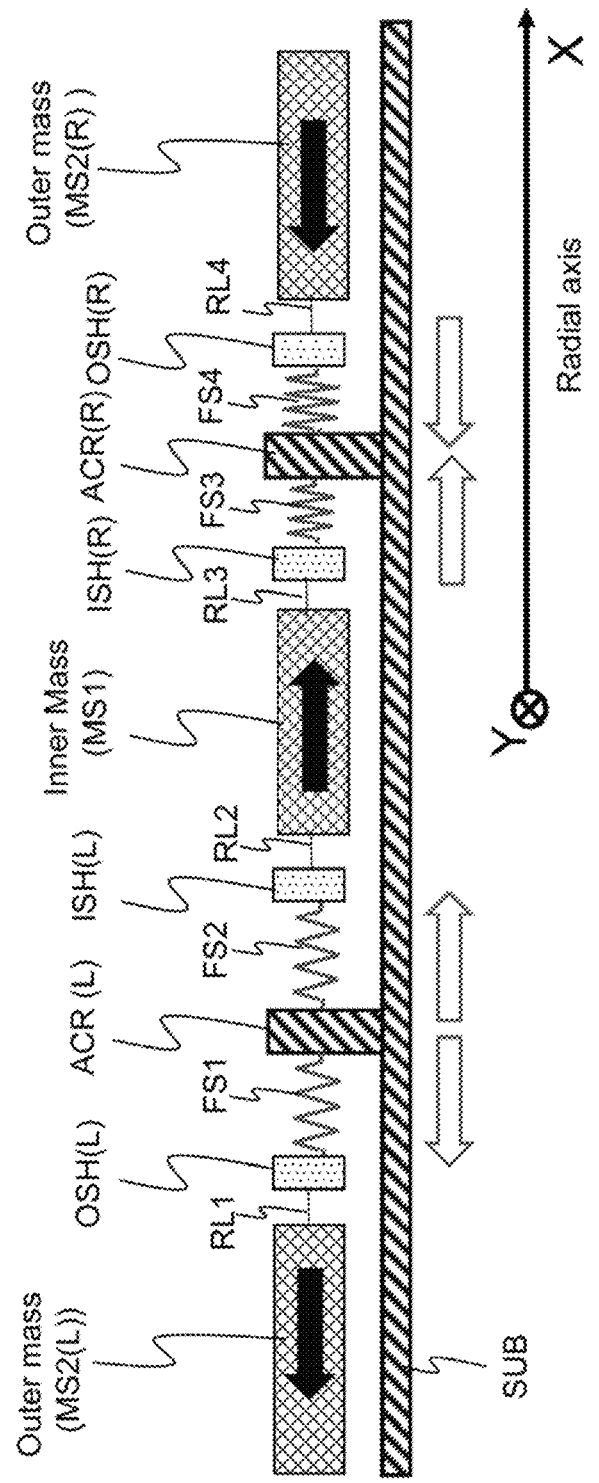
FIG. 7 A cross section of the proposed embodiment.

FIG. 7 shows a cross section of the device shown in FIG. 5 at line A. The cross section is along the radial axis. The picture captures the instant when the outer mass MS2 displaces to the left and the inner mass MS1 displaces to the right.

The left outer shuttle OSH(L) moves in the same direction as the left segment of the outer mass MS2(L) due to the rigid link RL1 that mechanical connects this two parts. The left outer shuttle OSH(L) moves away from the anchor ACR(L). The left inner shuttle ISH(L) moves in the same direction as the inner mass MS1 due to the rigid link RL2 that mechanically connects the inner mass MS1 to the inner shuttle ISH(L).

Left inner shuttle ISH(L) and outer shuttle OSH(L) move in an opposite direction. If the force exerted by the inner shuttle ISH(L) and the inner mass MS1 and the force exerted by the left outer shuttle OSH(L) and the outer mass MS2(L) is the same, the resulting force on the anchor ACR(L) will be nulled. That will reduce the energy loss through the anchors ACR(L) to the substrate SUB.

The inner mass MS1 and the right inner shuttle ISH(R) move in the same direction (right) due to the rigid link RL3 that mechanically connects the inner mass MS1 to the inner shuttle ISH(R). The right inner shuttle ISH(R) move towards the anchor ACR(R) and compresses flexure in soft link FS3 between right inner shuttle ISH(R) and the anchor ACR(R). The right outer shuttle OSH(R) and the outer mass MS2(R) move to the same direction (left) due to the rigid link RL4 that mechanically connects the outer shuttle OSH(R) and the outer mass MS2(R). The right outer shuttle OSH(R) moves toward the anchor ACR(R) and flexures the soft link FS4 between the outer shuttle OSH(R) and the anchor ACR(R). If the force exerted by the inner mass MS1 and the right inner shuttle ISH(R), and the outer mass MS2(R) and the right outer shuttles OSH(R) are the same the force exerted on the anchor ACR(R) is null and that avoids the leak of energy to the substrate SUB through the anchor ACR(R).

In above explanations, spring constant of rigid link RL1, RL2, RL3, and RL4 are big (stiff) in the radial axis direction, and spring constant of flexible link (spring) FS1, FS2, FS3, and FS4 are small (elastic) in the radial direction.

The phenomenon explained by FIGS. 6 and 7 are also result from the embodiment 1.

FIG. 8 shows a detail of the improved shuttles in FIGS. 5 and 7. Many of the elements have been described in the previous paragraphs. As explained in FIG. 7, flexible link (elastic spring) FS1 from outer shuttle OSH to the anchor ACR has low stiffness constant in X direction. Rigid link (elastic spring) RL1 from outer shuttle OSH to outer proof mass MS2 has high stiffness constant in X direction.

In Y direction, rigid link RLY1 from outer shuttle OSH to the anchor ACR with high stiffness constant in Y direction. Flexible link FSY1 from outer shuttle OSH to outer proof mass MS2 has low stiffness constant in Y direction.

As explained in FIG. 7, flexible link (elastic spring) FS2 from inner shuttle ISH to the anchor ACR has low stiffness constant in X direction. Rigid link (elastic spring) RL2 from inner shuttle ISH to inner proof mass MS1 has high stiffness constant in X direction.

In Y direction, rigid link RLY2 from inner shuttle ISH to the anchor ACR with high stiffness constant in Y direction. Flexible link FSY2 from inner shuttle ISH to inner proof mass MS1 has low stiffness constant in Y direction.

Outer shuttle OSH and inner shuttle ISH are connected by flexible link FSB having low stiffness constant in X direction. Each shuttles OSH, ISH have plurality of space for the transducer SFT corresponding to the electrodes.

It is important to know that the springs (flexible link) that connect the shuttles OSH, ISH to the masses MS1, MS2 and the shuttles OSH, ISH to the anchor ACR are very elastic in one direction and very rigid in the other direction. This fact makes the shuttle to only displace in one direction (1DOF) but allowing the proof masses to move in both direction of the XY plane (2DOF). In addition to that there is not preferred shape or geometry of the springs as long as they satisfy the condition of being very elastic in one direction and rigid in the other direction. According to the above structure, shuttles OSH and ISH disconnect a linkage of X direction oscillation and Y direction oscillation. Therefore, quadrature error (QUAD) would be decreased.

We use asymmetric shuttle in order to keep the concentrated anchor. In FIG. 8 we define the symmetry axis S. We can trace a line S from the center of mass of the two proof masses CM (usually center of 2 mass are matched) to the geometric center of the anchor ACRC. The shuttles OSH, ISH, due to the configuration of the springs will displace only along this direction. If we observe the shuttle spring anchor module respect to the before mentioned line S both the shuttles spring anchor structure shows perfect symmetry. However, if we perpendicularly draw a line SY that crosses the center of mass of the anchor we can see that the spring-shuttle-anchor module (SSA; a set of spring, shuttle and anchor) or CU is asymmetric respect to this last line SY. The latter define the symmetry axis to define the symmetry or asymmetry of the shuttles.

The flexibility of the design improves by applying asymmetric shuttle. It is easy to insert a large electrode in the shuttles, so as to acquire large signal. As long as following design rule explained by FIG. 8, asymmetric design does not exert a bad influence in view of accuracy signal. Mass of shuttles OSH and ISH should be same for obtain same resonance frequency of mass MS1 and MS2.

Another important aspect of the improvement is the definition of concentrated anchor. In FIG. 3 that was introduced before we diagrammatically depicted the area of the chip as Ac And the area of the connection unit CU as As. Area As is defined as an area covering all connection unit CU. If we could technically realize a sensors with full functionality and infinitesimal area of spring Ac, we ideally could eliminate the frequency split or at least reduce it infinitesimally. The ideal ratio As/Ac will be almost 0. However, the latter is difficult to implement in actual device. Any actual implementation of a sensor that requires same frequency for drive and sense mode will have a finite area of spring. We define concentrated anchor as Ac/As lower than 0.7, preferably 0.5 or less. In the literature most of the silicon based micromachined gyroscope present a ration As/Ac bigger that 0.8. There is no actual implementation of devices with As/Ac lower that this value.

Another key aspect to consider in this implementation is that we can increase the number of electrodes, the area of the electrodes, the size of the shuttles and the size of the suspended mass in order to reduce the frequency, increase the effective transducer area. But always keeping the distance between the center of masses CM and the center of the anchor ACRC, D in FIG. 8 as small as possible and the center of the anchor thus keeping the concentrated anchor architecture. Most importantly we can modify the area of the device, the number of the electrodes and the shape of the masses without increasing the As/Ac ratio.

FIG. 9 shows a detail of the displacement of the inner mass MS1 and outer mass MS2 of FIG. 8. FIG. 9 depicts deformation of the flexible links for the two mechanical modes. shuttles OSH, ISH when the masses MS1, MS2 are moving in X or Y is explained. In this picture Y displacement is perpendicular to the radial axis, or parallel to the symmetry axis SY. X displacement is parallel to the radial axis and perpendicular to the symmetry axis SY.

Figure 9A:
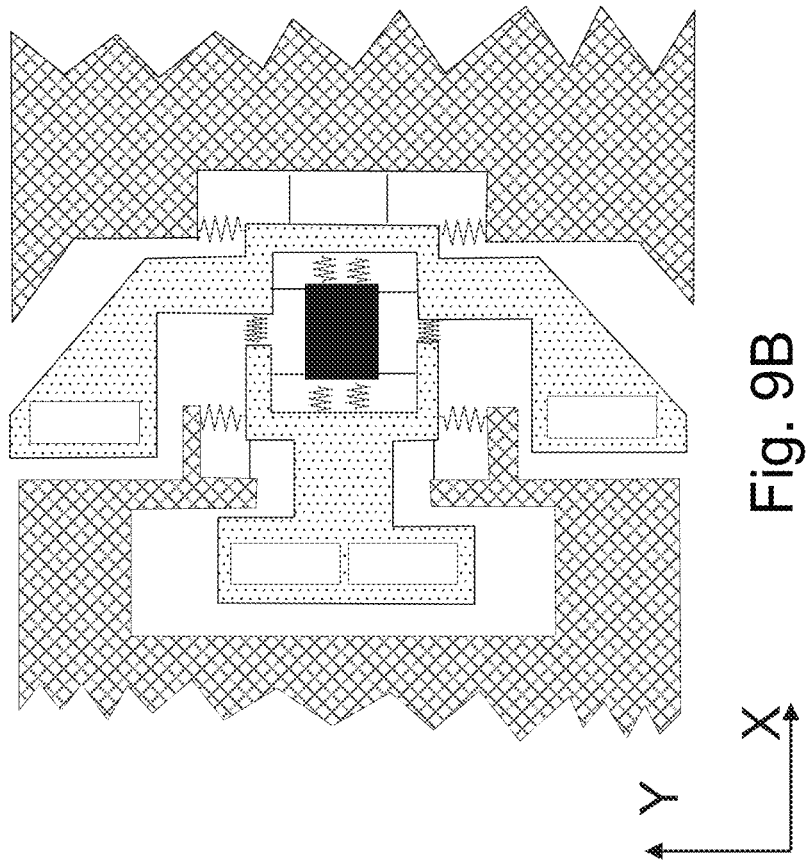
FIGS. 9A and 9B Details of the displacement of the inner mass MS1 and outer mass MS2 of FIG. 8.

As shown in FIG. 9(a), when the masses MS1, MS2 are moving in an out of phase fashion in a Y axis, the springs that connect the inner and the outer mass with the inner and outer shuttles respectively are elastic in Y direction. At the same time the springs that connect the inner and outer shuttle with the anchor are rigid in the Y direction. The consequence is that proof masses MS1, MS2 are free to oscillate in the Y direction but the shuttles are "locked" in X direction. They do not move.

Figure 9B:
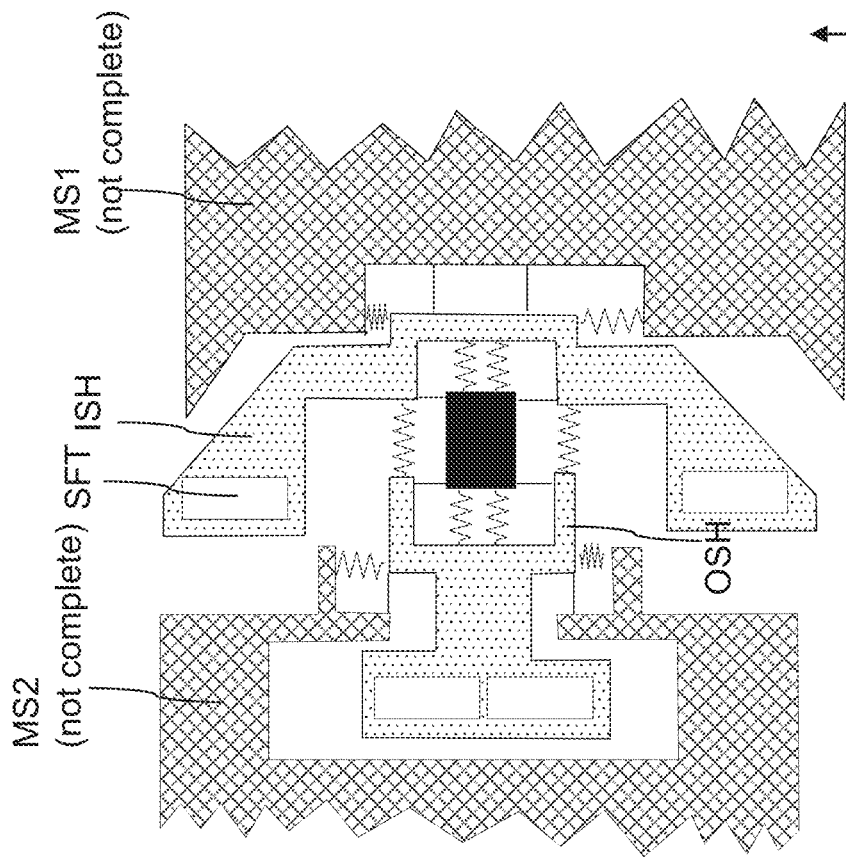

Next we analyze what happen when the inner and outer mass are moving in out of phase displacement along the X axis. As shown in FIG. 9(b), the elastic spring that connects the inner and outer mass with the inner and outer shuttle respectively is rigid along the X direction, that forces the inner shuttle ISH to follow the displacement of the inner mass MS1 and the outer shuttle OSH to follow the displacement of the outer mass MS2. At the same time the mechanical connector that connects the inner and outer shuttle with the anchors are flexible along the X axis (but rigid in the Y axis) thus the shuttles (and the proof masses) approach and separates from each other according to the displacement of the outer mass. Inner an outer shuttle are mechanically connected with spring that is elastic in the radial direction. The propose of this spring is the mechanically synchronize the oscillation of the inner and outer mass.

Any coupled oscillator system, as shown in this improvement has coupled resonant modes that are opposite in phase in any axis. There is the abovementioned antiphase mode and then a corresponding in-phase mode. In the in phase mode both masses are moving in the same direction with the same phase. In the in-phase mode the relative distance between the center of masses of the both the inner and the outer mass is constant. And this mode can be observed, at least in X and Y axis, although it is possible to observe this mode in the Z axis. In-phase and out-of phase torsional mode can also be possible. In gyroscope operation, the anti-phase mode is considered the functional mode due to the properties mentioned before. And the in-phase mode is considered an unwanted parasitic mechanical mode. In general, both modes should be apart from each other in order to avoid mechanical interference. The in phase mode can be also used to measure linear accelerations.

Considering the stiffness constant of the springs that connect the mass MS1, MS2 with the shuttles OSH, ISH in a perpendicular direction respect to the radial axis as $k_{ys}$, stiffness constant of the springs that connect the shuttles OSH, ISH with the anchor ACR in the radial axis direction as $K_{xa}$, the mass of the inner and outer mass as $m_i$ and $m_O$ respective and the effective spring between the shuttles as $K_c$. By controlling the relationship between the $K_c$ and $k_{ys}$ frequency separation between the in-phase and the out of phase mode can be controlled.

Figure 10:
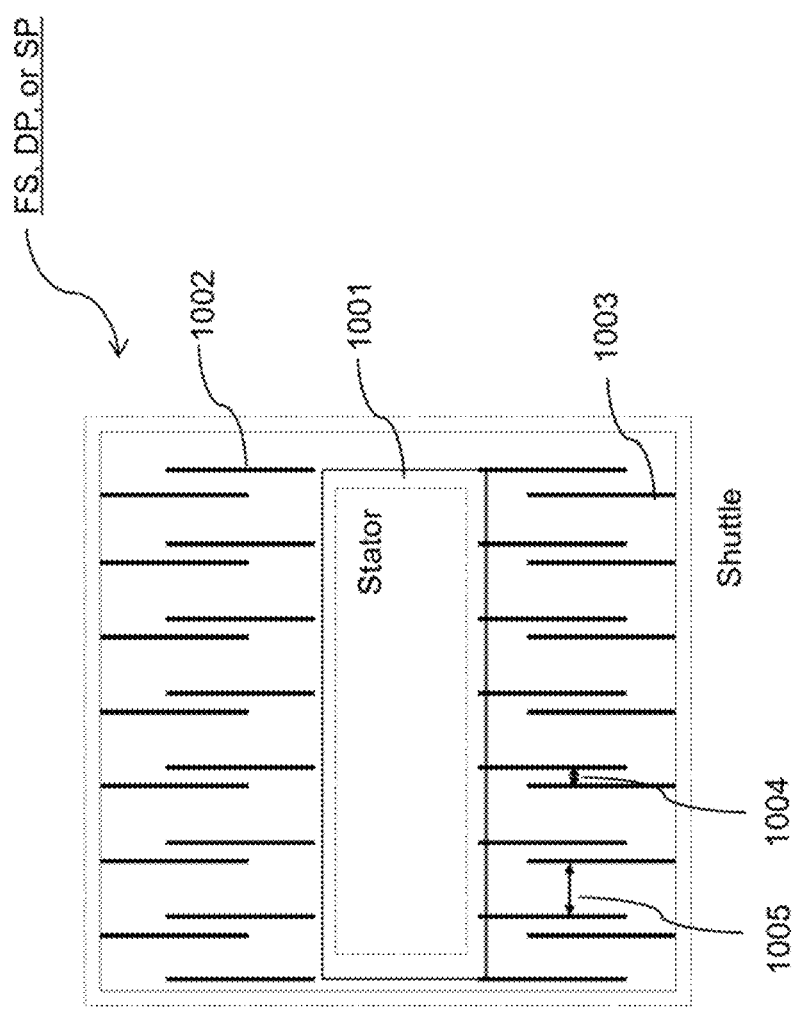
FIG. 10 A schematic drawing of an example of the electrostatic electrodes.

FIG. 10 shows an example of the electrostatic electrodes for sensing and excitation of the masses. This device is applied for any of drive forcer DF, drive pick off DP and the sense pick off SP.

In one example a fixed plate (stator) 1001 anchored to the substrate has several capacitive plates; static plate 1002 that are interleaved with some parallel plates; shuttle plate 1003 of the shuttles. This electrodes 1002 and 1003 can have the same equivalent capacitance of transduction or can be different. It is important that the force applied to two masses is the same in order to keep the device dynamically balanced. In the picture the transduction gap 1004 is smaller that the transduction antigap 1005. However any configuration will work.

In order to increase the control capacitance to increase the accuracy and the sensitivity and reduce the energy required to keep the gyroscope oscillating a solution is to increase the number or the size of the capacitance. That will require to increase the size of the electrodes.

FIG. 11 shows an example of an actual implementation of an asymmetric spring-shuttle-anchor module which increases capacitance effectively. In this particular figure static plates 1002 are embedded in the shuttle plates 1003 but are not shown in the figure to make the figure easier to understand.

The shape of the spring have been chosen in order to achieve elasticity in one direction and large stiffness in the perpendicular direction. The size, shape and material of the spring is not critical. Any of those can be used. In FIG. 11 embodiment, springs are prepared by U-shaped spring having both functions of flexible link and rigid link.

U-shaped spring 1101 (we also called it "beam") from the inner shuttle ISH to the inner mass MS1 which is not shown in FIG. 11. The spring 1101 is elastic in perpendicular direction to the axial axe and still in the radial direction.

U-shaped spring 1102 from the outer shuttle OSH to the outer mass MS2 which is not shown in FIG. 11. The spring 1102 is elastic in the perpendicular direction to the axial axe and stiff in the radial direction.

U-shaped Spring 1103 from anchor ACR to inner shuttle ISH. The spring 1103 is elastic in the radial direction and stiff in the perpendicular direction.

U-shape spring 1104 between the anchor ACR and the outer shuttle OSH. The spring 1104 is flexible in a radial direction and stiff in a perpendicular direction.

Coupling U-shape spring 1105 between the inner shuttle ISH and the outer shuttle OSH. The spring 1105 is flexible in a radial direction and stiff in a perpendicular direction.

Figure 12B:
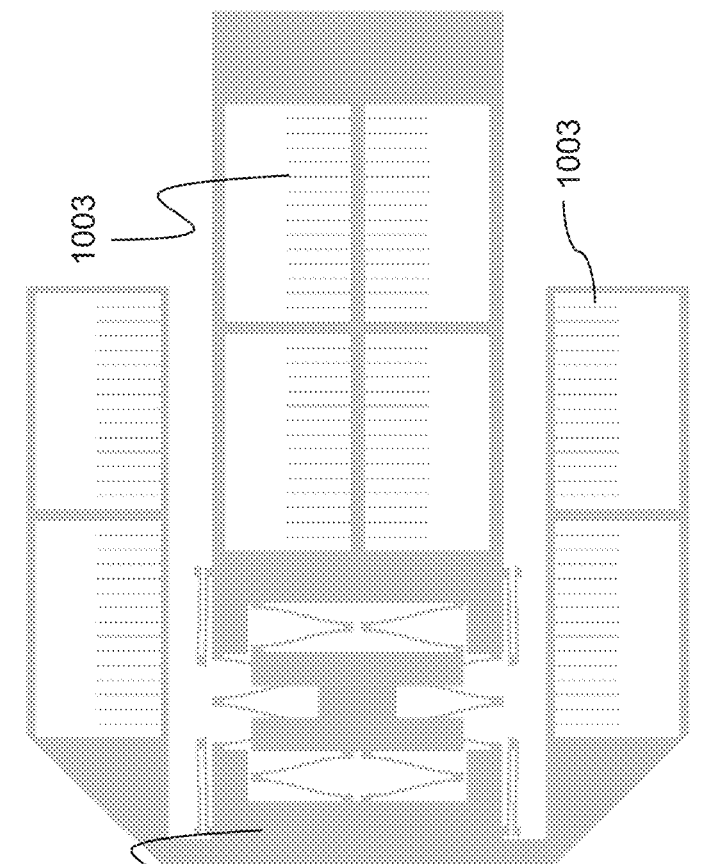
Figure 12A:
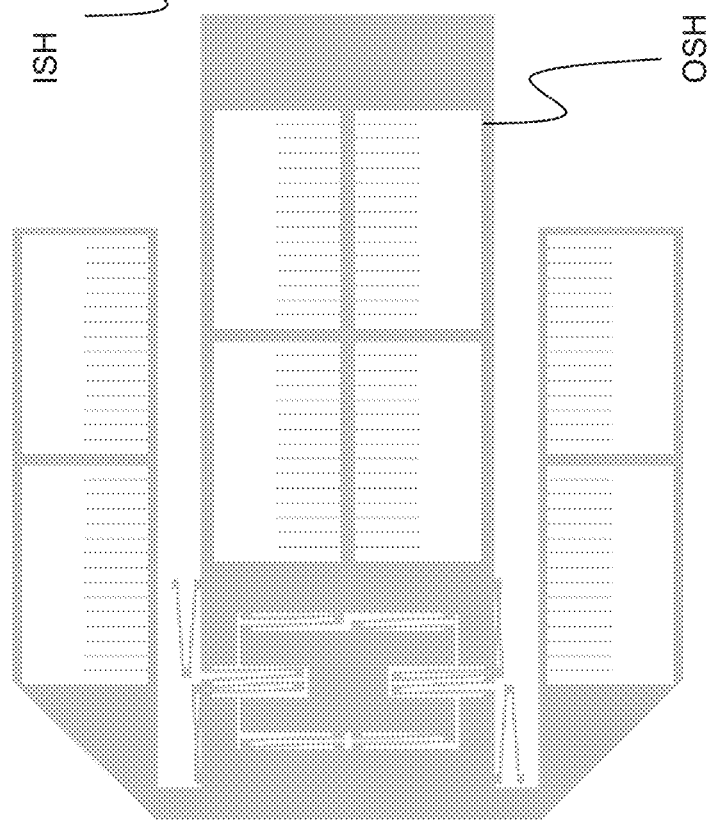

FIGS. 12A and 12B depict example of deformation of the beams shown in FIG. 11. In FIG. 12(*a*) we can see the deformation of the beams when the two proof masses (not included in the figure), are moving in an out-of-phase mode perpendicular to the radial axis. In this situation the shuttles are not moving in any direction due to the special configuration of the springs. Therefore the motion around the electrodes embedded in the shuttles is nulled.

In FIG. 12(*b*) we can see the deformation of the beam when the two masses are moving in anti-phase mode along the radial axis. In case, shuttles are moving in the same direction and the same phase as the associated proof mass. In this particular example the inner proof mass (no shown in the picture) is moving to the right so does the corresponding inner shuttle. The outer proof mass (not included in the picture) is moving to right side so does the corresponding outer shuttle. In this case the gap between the static plates 1002 and the shuttle plates 1003 change according the displacement of the shuttles.

Figure 13:
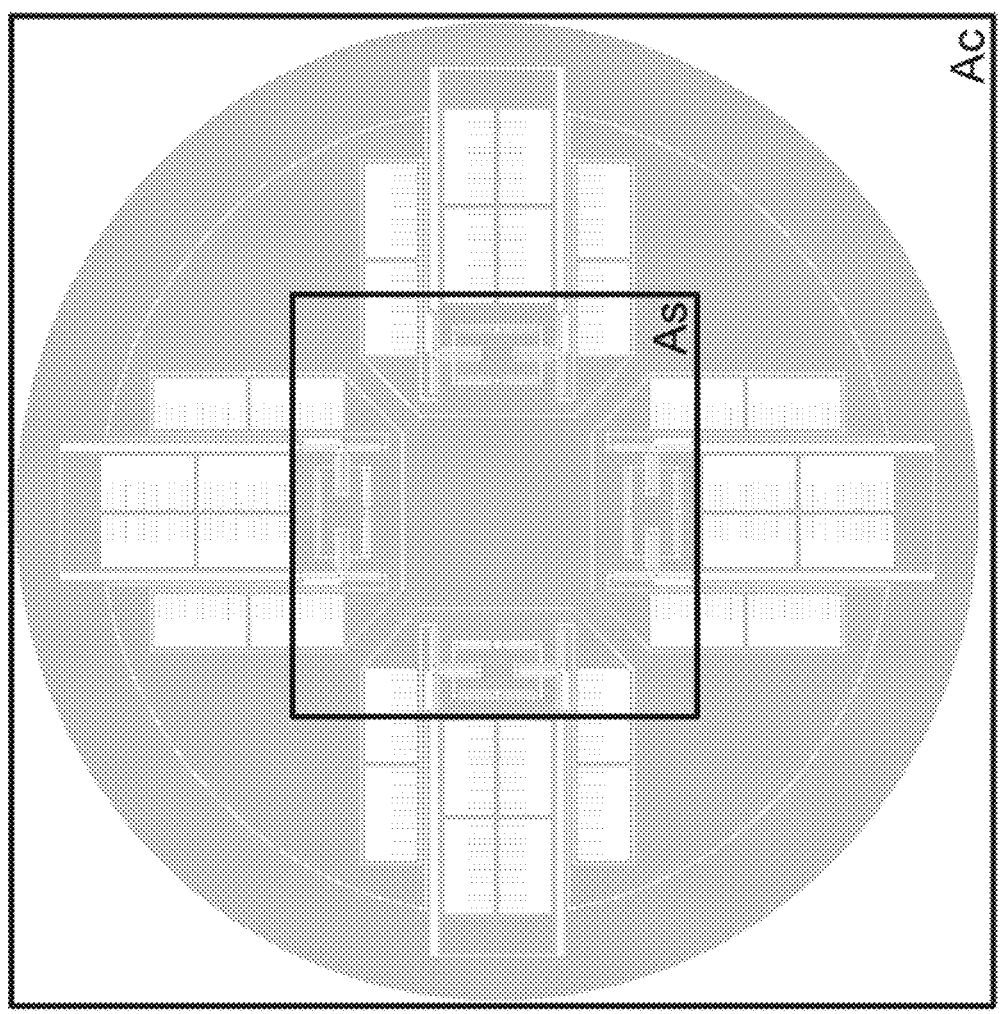
FIG. 13 A top view of possible topologies of connection unit CU and electrodes for sensing and excitation.

FIG. 13 shows a possible topologies of connection unit CU and electrodes for sensing and excitation. In the FIG. 13 we show a practical implementation of the concentrated anchor gyroscope. In this case there is circular outer mass MS2 and a circular inner mass MS1. There are four spring-shuttle-anchor module distributed around the center of the device in 90 degrees from each other. The static electrodes inside each shuttle are not included in the figure. But it is understood that this electrodes are required for electrostatic actuation and capacitive sensing.

In this particular example, there are 32 electrodes. That is, 16 electrodes in X axis and 16 electrodes in the Y axis. The number of electrodes per axis can be increased, and the area of the device can be increased. However the area of the springs can be keep constant thus reducing the ratio As/Ac. In addition, although this embodiment is showing 3 shuttles-spring-anchor modules any other actual can include 8. It is important for the good performance of the device that the device, including the shuttle-spring anchor modules is symmetric in X and Y to guarantee dynamic balance and the same performance in both axis. In the picture, the shape of the proof masses is circular, it is understood that square, triangular, hexagonal or other shape would also we acceptable. At this point we have no studies to determine what shape provides better performance.

About a circuit for control the above mentioned gyroscope, we can use circuit described in patent literature 1. The inner mass MS1 and the outer mass MS2 are electrically and mechanical coupled to the electrodes. The sense electrode DP sense the displacement in the drive axis and generate a sense signal that is current. The current is converted into voltage by current to voltage converter or amplifiers. One example of configuration is that the inner proof mass MS1 electrode is connected to the + terminal of the differential amplifier and the outer proof mass MS2 is connected to the − terminal of the differential amplifier. The differential amplifier output is fed to an inverting amplifier and a non inverting amplifier through a phase delay circuit. In this way the drive signal applied into the inner mass MS1 is 180 degrees phase delayed to the drive signal applied to the outer mass MS2. Amplifier can control the antiphase or in-phase motion of the gyroscope.

The output of the amplifier can be fed to a Phase Looked Loop (PLL). The output of the PLL could be fed back to the inverting and not inverting amplifiers.

FIG. 14 shows a block diagram of a control circuit. The electrical currents Py and Px picked up by the sense electrodes in the Y and X axis are fed into the PLL amplifier 1401. Signals are mixed with a orthogonal phased shifted sinusoidal sin(f) and cos(f) generated by a oscillator. Next the signals input to filter 1402 to remove unwanted frequency components such as parasitic signals and noise so as to provide output signals sx, cx, sy, cy.

Outputs from the demodulator are processed by pendulum equation converter 1403 and the pendulum variable E, Q and θ are obtained. This variable is fed into proportional-integral-derivative (PID) block 1404. E variable is input in the bloc AGC that controls the constant oscillation of the two masses. The Q is fed to the Q null that generates the force to null the quadrature error and finally is exerted into the FRB that is used to lock the oscillation in one direction. However, when the gyroscope is operating as a rate integrating gyroscope the block FRB is deactivated so the oscillation pattern is free to process. Forces are fed into an coordinate transformer 1405 that uses the angle of precession of the gyroscope aligns the forces with the angle of the gyroscope. The outputs of the coordinate transformation are modulated by modulator 1406 and fed back (Fx, Fy) into the corresponding electrodes to control the gyroscope.

Figure 15:
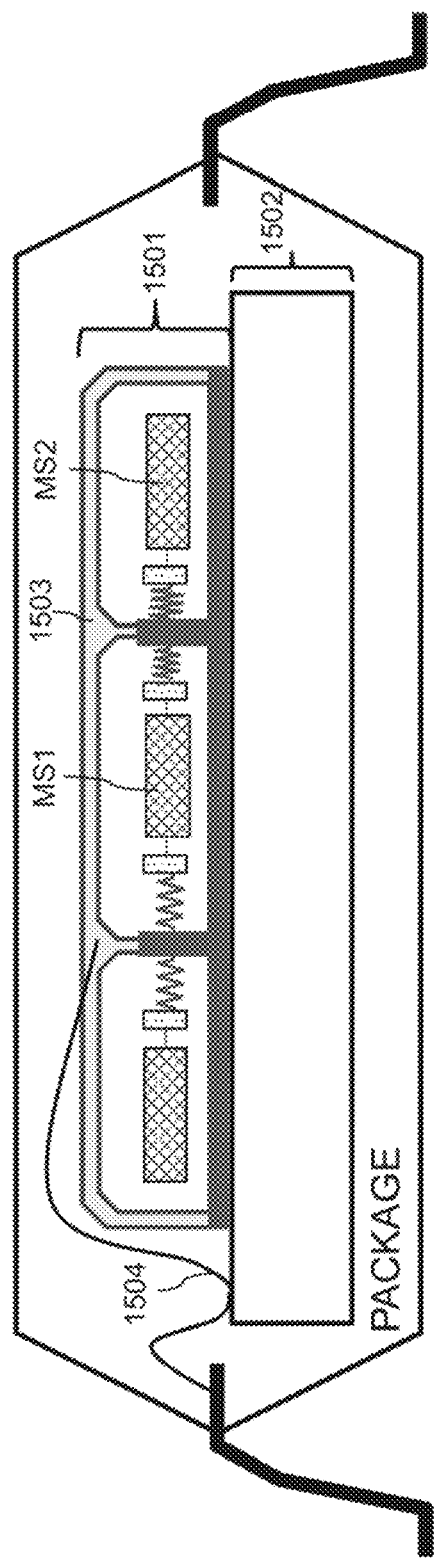
FIG. 15 A cross section of a possible implementation of the mechanical element.

FIG. 15 shows a cross section of a possible implementation of the mechanical element 1501 and the electronics 1502. For example the MEMS gyroscope will be fabricated in silicon and it will be capped by cap 1503 and vacuum sealed in order to preserve its mechanical goodness. For example, vacuum packaging remove the losses due to the air damping. In addition the sealing and capping protects the movable miniaturized structure from external threats such us dust.

The electronics 1502 can be implemented using standard Complementary Metal oxide Silicon (CMOS) technology and implement all the different building blocks explained in FIG. 14 using analog or digital technologies. The mechanical element 1501 and the CMOS circuit can be mechanically attached in a stacked way by using adhesive. The electrical connection can be done using wire bonding 1504.

More advance technologies allows interconnecting the mechanical element and the CMOS circuit by using metal vias that connect the two chips. To do so special aligned process has to be done. Other technologies allow to fabricate the device by using the metal layer that can be found inside the CMOS process thus removing the need for heterogeneous integration. That is called CMOS-MEMS process. The stacked device formed by the MEMS element and the CMOS control electronics are packaged inside plastic or ceramic package to facilitate the interconnection with other parts of the navigation or position control system.

In underground navigation there is no access to external position reference such as GPS. Navigation time is long if more than 20 minutes due to the spend limitation of the underground vehicles. Map of the underground tunneling is stored in vehicle memory. The movable platform self-position itself using IMU. Besides the speed, IMU is able to detect the rotation of the vehicle around the axis perpendicular to the ground in order the regulate the steering of the wheel. In that way the vehicle is able to safely navigate with GPS outage.

The platform is running a curved path at high speed. Communication with the Internet to access critical data is done at high speed using satellite base data link. Communication satellites are in geostationary at 36000 Km from the earth. In order to assure secure and reliable data transfer the communication antenna of the vehicle has to be constantly pointed to the communication satellite. Gyroscope detects the turns and rotations of the movable platform providing an input signal to a control loop that will actuate a motor to correct the positions of the antenna.

According to the above mentioned embodiments, one can obtain a Gyroscope with high Q factor by the effects of the fabrication tolerances to reduce the frequency separation between the drive and the sense mode, but also cancels lateral motion in the sense capacitance to reduce the quadrature error.

Those skilled in the art will appreciate that varying adaptations and modifications of the just described embodiment can be configured without departing from the scope and spirit of the invention. Therefore, it is to be understood that, within the scope of the appended claims, the invention may be practiced other than as specifically described herein.

REFERENCE SIGN LIST

MS1: first mass
MS2: second mass
ACR: anchor
SH: shuttle
OSH: outer shuttle
ISH: inner shuttle
CU: connection unit
DF: drive forcer
DP: drive pick off
SP: sense pick off
SF: sense forcer
RL: rigid link
FS: flexible spring

The invention claimed is:

1. A Gyroscope including a semiconductor chip,
wherein the semiconductor chip comprising;
a substrate,
a first mass which can move in any direction of a X-Y plane,
a second mass which can move in any direction of the X-Y plane,
a connection unit located between the first mass and the second mass which mechanically connects the first mass and the second mass,
the connection unit comprising;
  an anchor fixed to the substrate,
  a first shuttle located between the anchor and the first mass,
  a second shuttle located between the anchor and the second mass,
  a first beam connecting the anchor and the first shuttle,
  a second beam connecting the anchor and the second shuttle,
  a third beam connecting the first mass and the first shuttle,
  a fourth beam connecting the second mass and the second shuttle,
  a fifth beam connecting the first shuttle and the second shuttle, and,
  the anchor is located between the first shuttle and the second shuttle, and,
  the first shuttle and the second shuttle have a different shape, and each of them have an electrode.

2. The Gyroscope of claim 1,
wherein,
the first beam is flexible in X direction more than in Y direction,
the second beam is flexible in X direction more than in Y direction,
the third beam is flexible in Y direction more than in X direction,
the fourth beam is flexible in Y direction more than in X direction.

3. The Gyroscope of claim 2,
wherein,
at least one of the first beam, the second beam, the third beam, the fourth beam, and the fifth beam is U shaped flexural beam.

4. The Gyroscope of claim 1,
wherein,
a mass of the first mass and a mass of the second mass are substantially same.

5. The Gyroscope of claim 4,
wherein,
a center of mass of the first mass and a center of mass of the second mass are substantially same position which defines a center of mass CM.

6. The Gyroscope of claim 5,
when defining a line S which links the center of mass CM and a center the anchor, and defining a line SY which passes on the center of the anchor which is perpendicular to the line S,
the first shuttle and the second shuttle shows symmetry respect to the line S, and,
the first shuttle and the second shuttle shows asymmetry respect to the line SY.

7. The Gyroscope of claim 1,
wherein,
a mass of the first shuttle and a mass of the second shuttle are substantially same.

8. The Gyroscope of claim 1,
wherein,
the first mass has a recess toward a center of it,
the second mass is surrounding the first mass, and has a convex opposing to the recess,
the connection unit is located between the recess and the convex.

9. The Gyroscope of claim 1,
wherein,
the electrode of the first shuttle oscillates the first shuttle in one direction, and
the electrode of the second shuttle senses oscillation of the second shuttle in said one direction.

10. The Gyroscope of claim 1,
wherein,
the electrode of the first shuttle senses oscillation of the first shuttle in one direction, and
the electrode of the second shuttle senses oscillation of the second shuttle in said one direction.

11. The Gyroscope of claim 1,
when defining an area Ac as area of the semiconductor chip, and an area As as area covering all of the connection units,
ratio of As for Ac is smaller than 0.7.

12. The Gyroscope of claim 11,
wherein,
ratio of As for Ac is smaller than 0.5.

13. A Gyroscope including a semiconductor chip,
wherein the semiconductor chip comprising;
a substrate,
a first mass which can move in any direction of a X-Y plane,
a second mass which can move in any direction of the X-Y plane,
a connection unit located between the first mass and the second mass which mechanically connects the first mass and the second mass,
the connection unit comprising;
    an anchor fixed to the substrate,
    a first shuttle located between the anchor and the first mass,
    a second shuttle located between the anchor and the second mass,
    a first beam connecting the anchor and the first shuttle,
    a second beam connecting the anchor and the second shuttle,
    a third beam connecting the first mass and the first shuttle,
    a fourth beam connecting the second mass and the second shuttle,
    a fifth beam connecting the first shuttle and the second shuttle, and,
    the anchor is located between the first shuttle and the second shuttle, and,
when defining an area Ac as area of the semiconductor chip, and an area As as area covering all of the connection units,
ratio of As for Ac is smaller than 0.7.

14. The Gyroscope of claim 13,
wherein,
ratio of As for Ac is smaller than 0.5.

15. The Gyroscope of claim 13,
when defining a line X passing on a center of the anchor, and a line Y passing on the center of the anchor which is perpendicular to the line X, in the X-Y plane,
arrangement of the first shuttle and the second shuttle is line-symmetry to the line X, and line-asymmetry to the line Y.

* * * * *